United States Patent
Nishita et al.

(10) Patent No.: US 8,307,141 B2
(45) Date of Patent: Nov. 6, 2012

(54) MULTI-CORE PROCESSOR, CONTROL METHOD THEREOF, AND INFORMATION PROCESSING APPARATUS

(75) Inventors: Satoru Nishita, Kahoku (JP); Yukio Nishimura, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 473 days.

(21) Appl. No.: 12/574,337

(22) Filed: Oct. 6, 2009

(65) Prior Publication Data

US 2010/0095040 A1    Apr. 15, 2010

(30) Foreign Application Priority Data

Dec. 10, 2008    (JP) ................................. 2008-314282

(51) Int. Cl.
  *G06F 13/14*    (2006.01)
  *G06F 15/167*   (2006.01)
  *G06F 9/54*     (2006.01)

(52) U.S. Cl. ........ 710/260; 719/312; 719/313; 709/201; 709/213

(58) Field of Classification Search ............. 710/260, 710/267; 719/312–313, 319; 709/201–202, 709/214–215; 718/102, 105–108
See application file for complete search history.

(56) References Cited

U.S. PATENT DOCUMENTS

| | | | | |
|---|---|---|---|---|
| 4,394,727 A * | 7/1983 | Hoffman et al. | ............. | 718/103 |
| 4,410,944 A * | 10/1983 | Kronies | ............. | 711/147 |
| 5,142,683 A * | 8/1992 | Burkhardt et al. | ............. | 709/215 |
| 5,375,219 A * | 12/1994 | Okabe | ............. | 711/147 |
| 5,390,328 A * | 2/1995 | Frey et al. | ............. | 719/315 |
| 5,469,570 A * | 11/1995 | Shibata | ............. | 717/124 |
| 5,850,521 A * | 12/1998 | Morganti et al. | ............. | 709/208 |
| 6,247,077 B1 * | 6/2001 | Muller et al. | ............. | 710/74 |
| 6,751,706 B2 * | 6/2004 | Chauvel et al. | ............. | 711/122 |
| 6,925,532 B2 * | 8/2005 | Fujibayashi et al. | ............. | 711/114 |
| 6,931,643 B2 * | 8/2005 | Gardner | ............. | 719/313 |
| 7,117,319 B2 * | 10/2006 | Arimilli et al. | ............. | 711/156 |
| 7,197,586 B2 * | 3/2007 | DeWitt et al. | ............. | 710/260 |
| 7,233,977 B2 * | 6/2007 | Gupta et al. | ............. | 709/216 |
| 7,350,006 B2 * | 3/2008 | Yasue et al. | ............. | 710/264 |
| 7,607,757 B2 * | 10/2009 | Silverbrook et al. | ............. | 347/49 |
| 7,716,397 B2 * | 5/2010 | Henry | ............. | 710/52 |
| 7,882,333 B2 * | 2/2011 | Khatri | ............. | 712/16 |
| 7,921,151 B2 * | 4/2011 | Aguilar et al. | ............. | 709/202 |
| 8,028,292 B2 * | 9/2011 | Inoue et al. | ............. | 718/105 |

(Continued)

FOREIGN PATENT DOCUMENTS

JP    2001-167058    6/2001
(Continued)

*Primary Examiner* — Paul R Myers
*Assistant Examiner* — Trisha Vu
(74) *Attorney, Agent, or Firm* — Staas & Halsey LLP

(57) ABSTRACT

A multi-core processor which includes a plurality of processor dies. The multi-core processor has a first processor core which processes a first task and a second processor core which processes a second task. The first processor core and the second processor core are formed on each of the plurality of processor dies. When the first processor core makes a request for the second task processing in processing the first task, information on the second task is stored in a memory area used by the first processor core and interrupt notification is made to each of the second processor cores provided respectively on the plurality of processor dies. Each of the second processor cores having received the interrupt notification accesses the memory area used by the first processor core provided on the same processor die as the processor die on which the second processor core is provided.

9 Claims, 9 Drawing Sheets

U.S. PATENT DOCUMENTS

| | | | |
|---|---|---|---|
| 2004/0015969 A1* | 1/2004 | Chang | 718/100 |
| 2008/0077928 A1 | 3/2008 | Matsuzaki et al. | |
| 2008/0140756 A1* | 6/2008 | Tanaka et al. | 709/201 |
| 2008/0148015 A1 | 6/2008 | Takamoto et al. | |

FOREIGN PATENT DOCUMENTS

| | | |
|---|---|---|
| JP | 2006-260377 | 9/2006 |
| JP | 2008-84009 | 4/2008 |
| JP | 2008-152594 | 7/2008 |

* cited by examiner

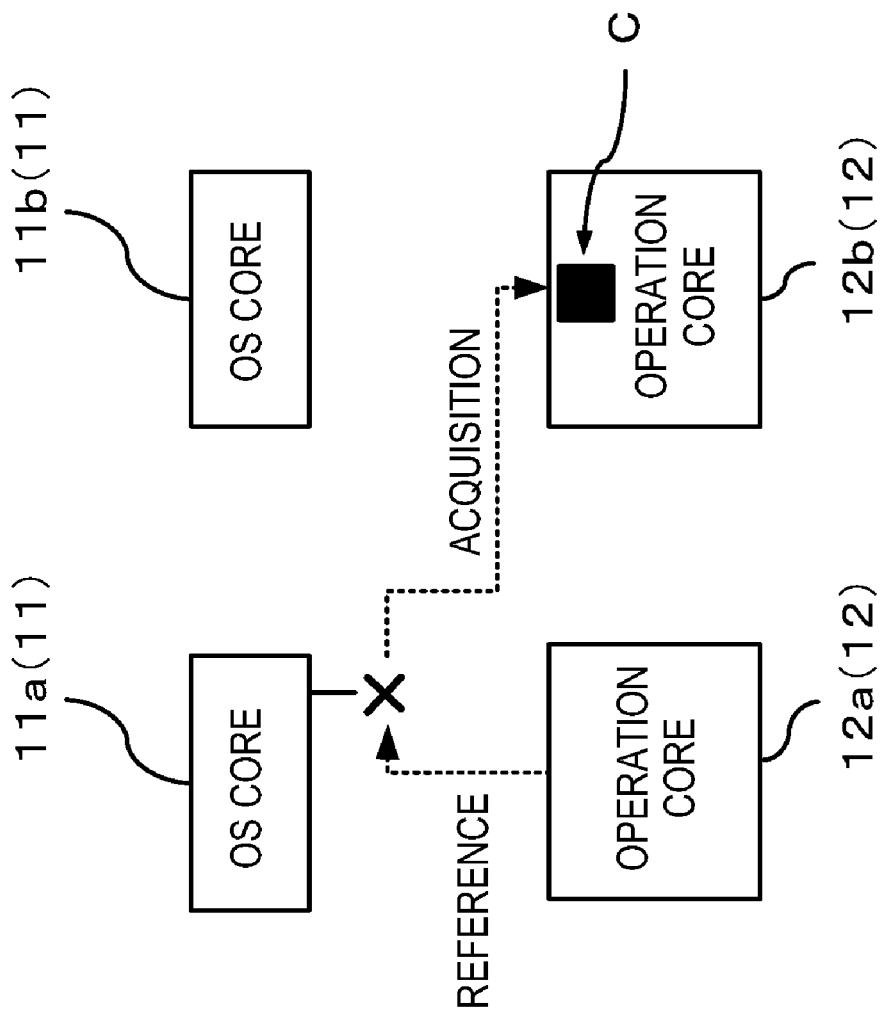

MULTI-CORE PROCESSOR, CONTROL METHOD THEREOF, AND INFORMATION PROCESSING APPARATUS

CROSS-REFERENCE TO RELATED APPLICATIONS

This application is based upon and claims the benefit of priority of the prior Japanese Patent Application No. 2008-314282, filed on Dec. 10, 2008, the entire contents of which are incorporated herein by reference.

BACKGROUND

1. Field

The embodiments discussed herein are related to a technique of executing a task(s) in a multi-core processor provided with a plurality of processor dies on each of which a plurality of processor cores is formed.

2. Description of the Related Art

In a multi-core processor provided with a plurality of processor cores within a single processor, each processor core may discretely execute a sequence of instructions. In consequence, each of the processor cores may also execute the sequence of instructions in parallel. Furthermore, a heterogeneous multi-core processor provided with a plurality of different types of processor cores in a single processor is well known.

This heterogeneous multi-core processor is provided with, for instance, an OS core executing a task(s) for an operating system (OS) and an operation core mainly executing operation processing, as the different types of processor cores as disclosed above.

In the conventional heterogeneous multi-core processors, a control unit controls an operating state of each core, whereby a task(s) may be executed. Based on the operating states of respective cores, the control unit selects the core to which a task(s) is assigned, and the control unit supplies the selected core with the task(s).

However, there is a problem in the conventional multi-core processor that control over the states of respective cores and over the selection or the like of the cores, to which the tasks are assigned, is complicated.

SUMMARY

According to an aspect of the invention, a multi-core processor includes a plurality of processor dies. The multi-core processor has a first processor core which processes a first task and a second processor core which processes a second task. The first processor core and the second processor core are formed on each of the plurality of processor dies. When the first processor core makes a request for the second task processing in processing the first task, information on the second task is stored in a memory area used by the first processor core and interrupt notification is made to each of the second processor cores provided respectively on the plurality of processor dies. Each of the second processor cores having received the interrupt notification accesses the memory area used by the first processor core provided on the same processor die as the processor die on which the second processor core is provided.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 9 illustrates is a schematic view for explaining the processing upon receipt of the interrupt notification from the OS core in the multi-core processor as one example of the embodiment.

DETAILED DESCRIPTION OF THE PREFERRED EMBODIMENTS

Figure 1:
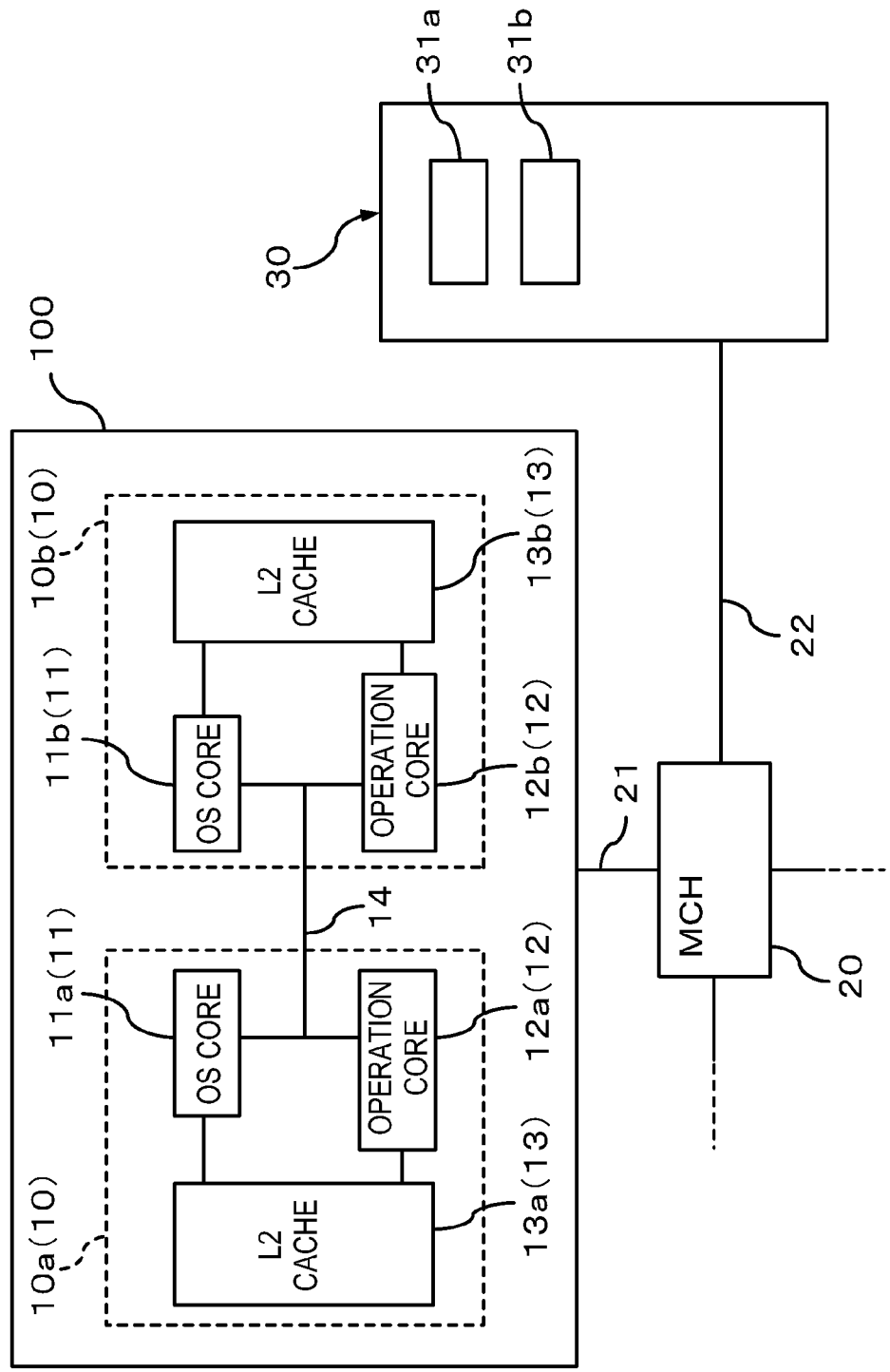
FIG. 1 illustrates a block diagram schematically indicating a configuration of a multi-core processor as one example of an embodiment.

Reference may now be made in detail to embodiments of the present invention, examples of which are illustrated in the accompanying drawings, wherein like reference numerals refer to like elements throughout.

Hereinafter, an embodiment for a multi-core processor, a method of controlling the multi-core processor, and an information processing apparatus will be disclosed with reference to drawings.

FIG. 1 illustrates a block diagram indicating a configuration of a multi-core processor as one example of the embodiment.

FIG. 1 indicates a central processing unit (CPU) 100, a memory control hub (MCH) 20, and a memory 30 that configure the multi-core processor.

The CPU 100 executes a variety of operation processing and control operations by running programs (jobs and tasks) stored in a storage unit (not shown), such as, the memory 30 or a hard disk drive or the like, so that a variety of functions may be achieved. The CPU 100 may be included in, for example, an information processing apparatus or a control apparatus. Moreover, this CPU 100 is provided on a mother board (not shown) along with the MCH 20 and the memory 30, in the information processing apparatus or the control apparatus.

The MCH 20 is a chip set that controls input and output of data to/from the CPU 100. The MCH 20 is communicably coupled to the CPU 100 through a CPU bus 21. Furthermore, a graphic card (not shown) and the memory 30 are coupled to the MCH 20. The MCH 20 controls sending and receiving of the data between the CPU 100 and the memory 30 or the graphic board. Note that, for example, a front side bus (FSB) may be used as the CPU bus 21 that couples the CPU 100 and the MCH 20. In addition, another chip set (for example, a south bridge that is not shown) is also coupled to the MCH 20. This south bridge controls inputting and outputting of the data between the CPU 100 and an input/output (I/O) device(s).

The memory 30 is a (main) memory unit that temporarily stores a variety of data and programs. The memory 30 is coupled to the MCH 20 through a memory bus 22. This memory 30 may be, for example, a random access memory (RAM).

The memory 30 is provided with an area (a memory area) 31 on which each of OS cores 11a and 11b in the CPU 100 is capable of writing and updating data (task information). An area 31a used by the OS core 11a and an area 31b used by the OS core 11b are indicated in FIG. 1.

Note that, with regard to the reference numerals used for indicating the area, the reference numerals 31a and 31b are used hereinafter when it is necessary to specify one of the plurality of areas. On the other hand, the reference numeral 31 is used when any given area is indicated. In addition, the memory 30 is also provided with areas (not shown) on which each of operation cores 12a and 12b in the CPU 100 is capable of writing and updating the data.

The CPU 100 is provided with a plurality of (two (2) in the example disclosed in FIG. 1) dies (processor dies) 10a and 10b as indicated by FIG. 1. The OS core (a first processor core) 11a, the operation core (a second processor core) 12a, and an L2 cache 13a are formed on the die 10a. In addition, the OS core 11b, the operation core 12b, and an L2 cache 13b are formed on the die 10b.

The OS core 11a and the OS core 11b have a similar structure. In the same manner, the operation cores 12a and the operation core 12b have a similar structure, and the L2 cache 13a and the L2 cache 13b have a similar structure. That is to say, the die 10a and the die 10b have a similar structure.

Moreover, the OS core 11a, the OS core 11b, the operation core 12a, and the operation core 12b are communicably coupled with each other through a bus 14.

Note that, with regard to the reference numerals used for indicating the OS core, hereinafter the reference numerals 11a and 11b are used when it is necessary to specify one of the plurality of OS cores. On the other hand, the reference numeral 11 is used when any given OS core is indicated.

The same holds true for the respective reference numerals that indicate the operation cores, the L2 caches, and the dies.

The OS core 11 is a processor core that executes a task(s) for the OS (a first task). Moreover, if a task(s) for operation processing in executing the OS is generated, the OS core 11 issues an operation request (a second task) to all of the operation cores 12 included in the CPU 100 to cause any of the operation cores 12 to execute the task(s) for the operation processing.

More specifically, the OS core 11 makes the operation request to all of the operation cores 12 included in the CPU 100 by making interrupt notification. For example, the OS core 11 makes the interrupt notification to the operation core 12 by inputting an interrupt signal to a given port and/or a given input terminal of the operation core 12. Note that a variety of known methods may be employed in order for the OS core 11 to make the interrupt notification to the operation core 12.

Moreover, the OS core 11 stores information related to the task(s) for the operation processing (task information) in a given area 31 of the memory 30 (queues) before the interrupt notification is made to the operation core 12.

More specifically, when it comes to the OS core 11a, the task information on the operation processing is stored in the area 31a of the memory 30 before the interrupt notification for the operation request is made to the operation core 12. In the same manner, when it comes to the OS core 11b, the task information on the operation processing is stored in the area 31b of the memory 30 before the interrupt notification for the operation request is made to the operation core 12.

This task information may be pieces of information on an operation command(s) (hereinafter, may be referred to as a "command(s)") and data associated with the processing executed by the command(s). For example, as the task information, pieces of information on the types of commands, the number of data, data size, a location to be stored, a location where results of the operation processing are stored or the like are stored in the area 31 in the format of a link destination address or the like.

In addition, the OS core 11 stores the task information in the area 31 and directs a cache controller (not shown) or the like, whereby the storing of the task information in the area 31 is reflected in the L2 cache 13.

Then, the OS core 11 makes the interrupt notification to all of the operation cores 12 after registering the task information disclosed above in a certain queue.

The L2 cache 13 is provided on the die 10 and serves as a memory unit that temporarily stores data or the like frequently used by the OS core 11 and the operation core 12. The OS core 11 and the operation core 12 access this L2 cache 13 in order to acquire data, such as, the task information or the like, before accessing an external memory area, such as, the memory 30 or the like. If desired data is not stored in the L2 cache, the OS core 11 and the operation core 12 access the memory 30 or the like in order to acquire the data.

In other words, the OS core 11 and the operation core 12 access the L2 cache 13 in order to acquire the data, such as, the task information or the like. If a cache miss occurs in the L2 cache 13, the OS core 11 and the operation core 12 access the memory 30 or the like in order to acquire the data.

In addition, the L2 cache 13 is shared by the OS core 11 and the operation core 12 formed on the same die 10. In other words, the OS core 11a and the operation core 12a share the L2 cache 13a formed on the same die 10a and the OS core 11b and the operation core 12b share the L2 cache 13b formed on the same die 10b.

Note that the L2 cache 13 is constantly updated by a cache controller (not shown).

The operation core 12 is a processor core that executes the task(s) for the operation processing (the second task). For example, when the CPU 100 is used as a processor for the controller of redundant arrays of inexpensive disks (RAID), exclusive or (XOR) operations, cyclic redundancy check (CRC) operations, operation commands for encryption, and so on are performed by the operation core 12, as the tasks for the operation processing.

In response to an operation request made from the OS core 11, this operation core 12 executes the command(s) (that is, performs operation processing) that are the task(s) of this operation processing, and the operation core 12 returns result thereof to the OS core 11.

In addition, the operation core 12 is capable of processing the operation request from any one of the plurality of OS cores 11a and 11b.

Upon receipt of the interrupt notification sent from the OS core 11, the operation core 12 accesses (references) the memory area controlled (used) by the OS core 11 on the same die 10 as the operation core 12 in order to acquire the task information.

More specifically, upon receipt of the interrupt notification from the OS core 11, the operation core 12a accesses the area 31a controlled by the OS core 11a on the die 10a in order to acquire the task information. In the same manner, upon receipt of the interrupt notification from the OS core 11, the operation core 12b accesses the area 31b controlled by the OS core 11b on the die 10b in order to acquire the task information.

Furthermore, the operation core 12, at first, accesses the L2 cache 13 on the same die 10 in order to acquire the task information. If the cache miss occurs in the L2 cache 13, then the operation core 12 accesses the area 31 of the memory 30.

It should be noted that, hereinafter, when the following description, namely, "the access to the memory area used by the OS core 11 provided on the same die 10" performed by the operation core 12, is made, such description includes both meanings, that is, [the operation core 12 accesses the area 31 of the memory 30] and [the operation core 12 accesses the L2 cache 13 prior to accessing the memory 30], in this embodiment.

In other words, the operation core 12, having received the interrupt notification, accesses each memory area controlled by the OS core 11 provided on the same die 10 as each of the operation cores 12 in order to acquire the task information on the operation processing.

As a result of the operation core 12 acquiring the task information from the L2 cache 13, the access to the memory 30 is not necessary. Since the access to the memory 30 is unnecessary, high-speed processing of the tasks may be achieved, so that processing speed of the CPU 100 may be enhanced.

Moreover, if the operation core 12 is unable to acquire the task information from the memory area controlled by the OS core 11 provided on the same die 10, the operation core 12 accesses (references) the area 31 controlled by the OS core 11 provided on the other die 10 in order to acquire the task information.

More specifically, if the operation core 12a is unable to acquire the task information from the L2 cache 13a and the area 31a that are each controlled by the OS core 11a, next, the operation core 12a accesses the area 31b of the memory 30 controlled by the OS core 11b in order to acquire the task information. In the same manner, if the operation core 12b is unable to acquire the task information from the L2 cache 13b and the area 31b that are each controlled by the OS core 11b, next, the operation core 12b accesses the area 31a of the memory 30 controlled by the OS core 11a in order to acquire the task information.

If the operation core 12 succeeds in acquiring the task information from the L2 cache 13 or the memory 30, the operation core 12 executes the task(s) for the operation processing by using this task information.

In addition, if the operation core 12 succeeds in acquiring the task information from the L2 cache 13 or the memory 30, the task information is deleted from the memory 30 or the L2 cache 13. Note that either the operation core 12 or the OS core 11 may delete the task information from the memory 30 or the L2 cache 13. Moreover, elements other than the operation core 12 or the OS core 11 may delete the task information from the memory 30 or the L2 cache 13.

Note that, upon receipt of the interrupt notification from the OS core 11, if the operation core 12 is currently executing the processing for the other task(s) (that is, in a busy state), the operation core 12 references the task information after completion of the task(s) in process. That is to say, the operation core 12 references the task information after entering into a state where no processing is currently being executed by the operation core 12 (that is, an idle state).

As disclosed above, thanks to the configuration in which the operation core 12 that is not currently executing any processing executes the task(s) in a preferential manner, the operation core 12 with low load preferentially executes the task(s). This allows the effective use of the plurality of operation cores 12.

Figure 2:
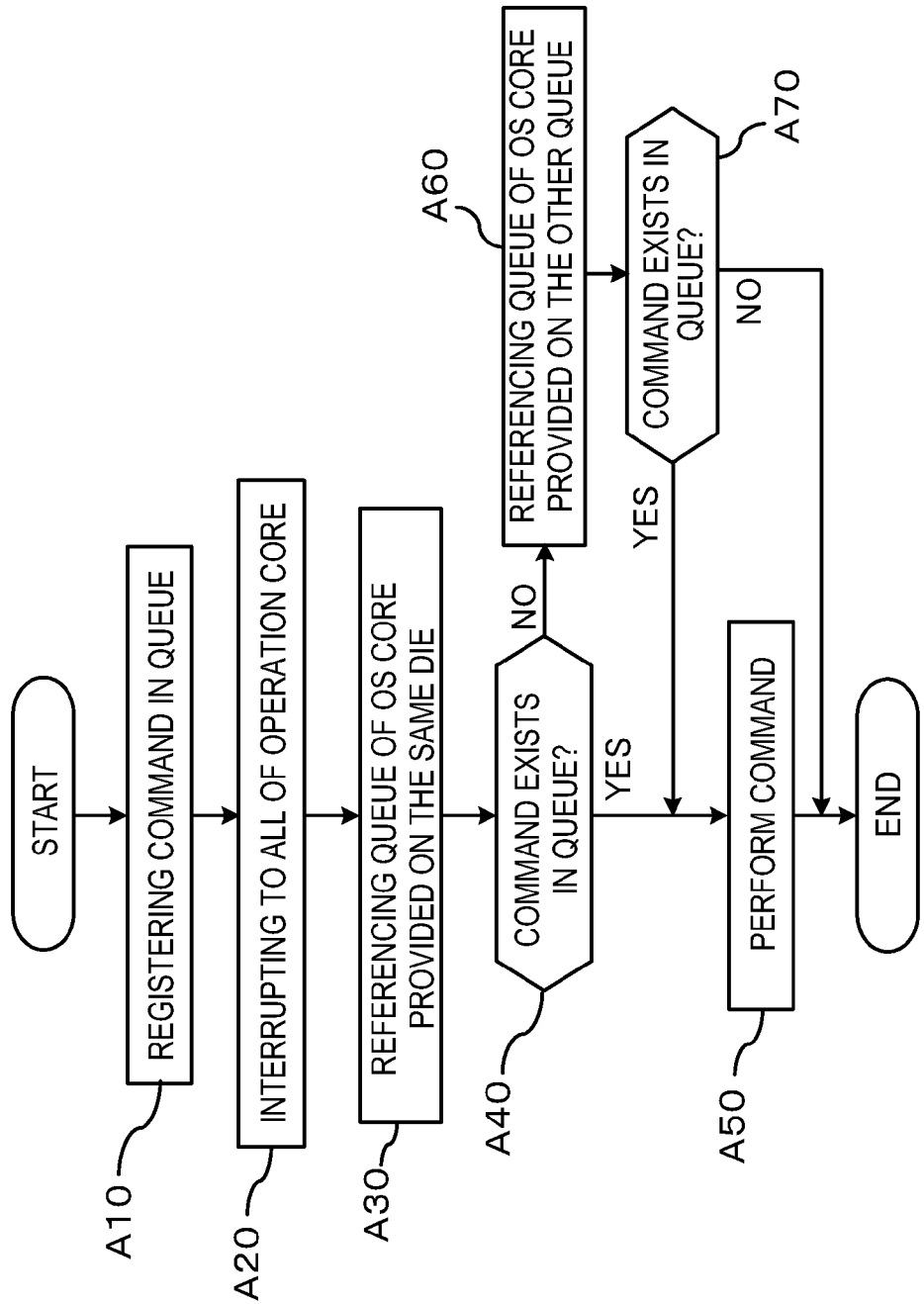
FIG. 2 illustrates a flowchart for explaining a method of processing tasks in the multi-core processor as one example of the embodiment.

A method of processing the task(s) in the CPU 100 as an example of the embodiment configured as disclosed above will be explained according to a flowchart in FIG. 2 (Operations A10 through A70) with reference to FIGS. 3 through 6.

FIGS. 3 through 6 are schematic views for explaining processing by the OS core 11 and the operation core 12.

Note that, in the examples indicated by FIGS. 3 through 6, a command(s) C actually registered in the area 31 or the L2 cache are shown adjacent the OS core 11a for descriptive purpose.

In addition, in FIGS. 3 through 6, the illustration of elements except the OS cores 11a and 11b, and operation cores 12a and 12b are omitted for descriptive purpose.

In addition, FIGS. 2 through 6 indicate an example in which each of the operation cores 12a and 12b receives the interrupt notification from the OS core 11a when the both of the operation cores 12a and 12b is placed in the idle state.

Figure 3:
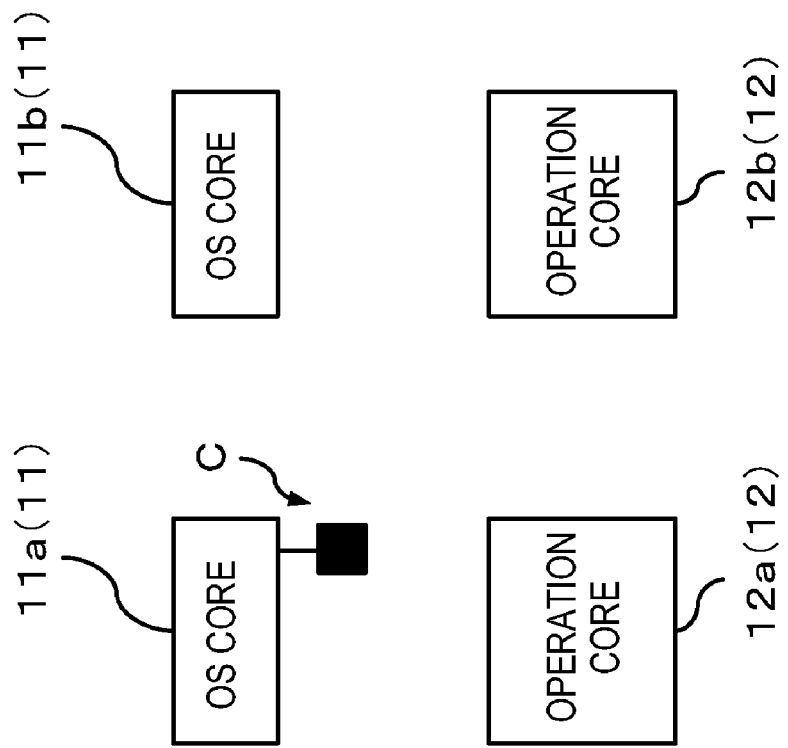
FIG. 3 illustrates a schematic view for explaining processing executed by an OS core and processing executed by an operation core in the multi-core processor as one example of the embodiment.

For example, if a task(s) for operation processing is generated in the CPU 100 while the OS core 11a is currently executing the task(s) for the OS, as illustrated in FIG. 3, the OS core 11a registers the task information (a command(s) or the like) in the area 31a and/or the L2 cache 13a (Operation A10).

Figure 4:
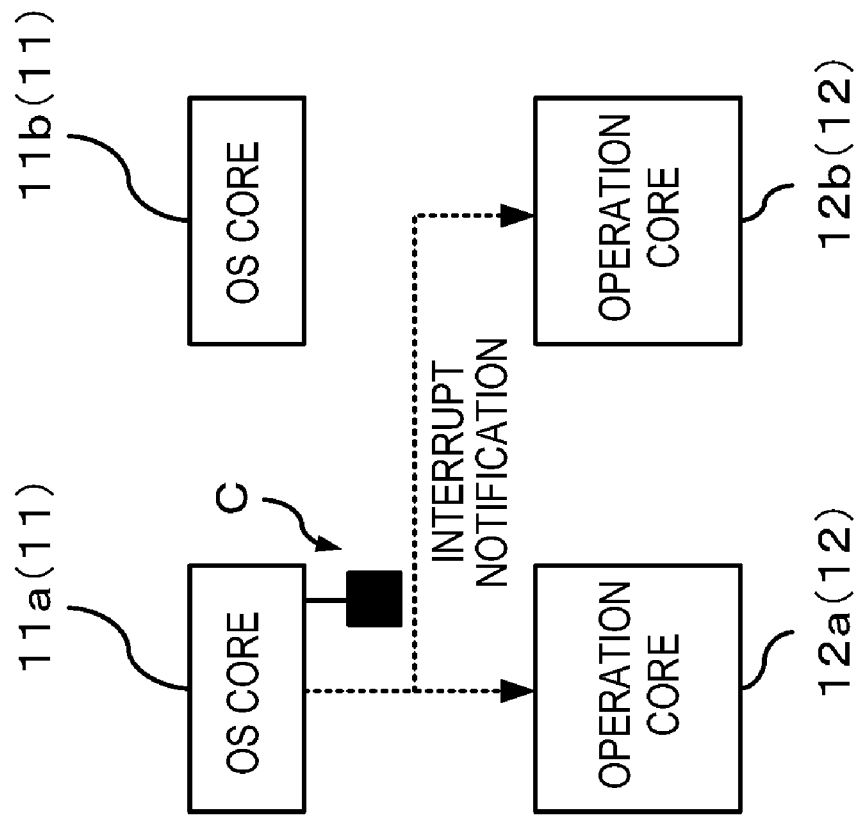
FIG. 4 illustrates a schematic view for explaining the processing executed by the OS core and the processing executed by the operation core in the multi-core processor as one example of the embodiment.
Figure 5:
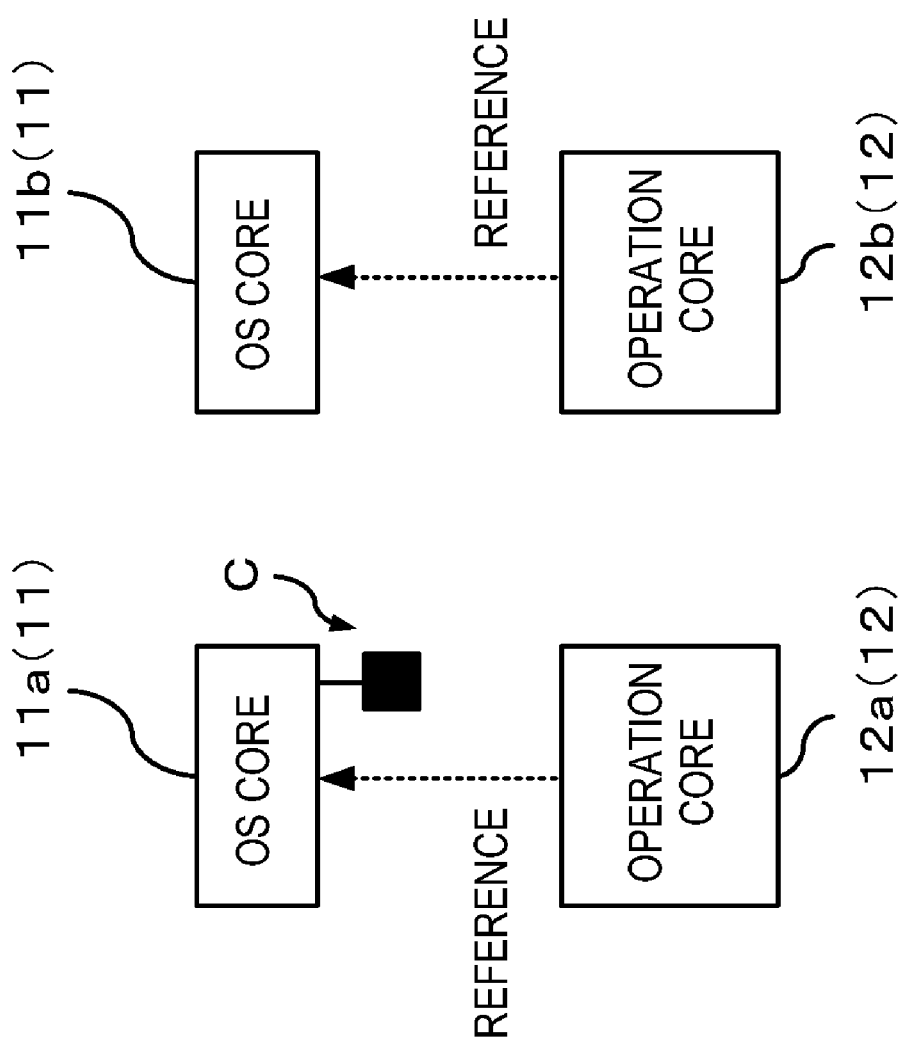
FIG. 5 illustrates a schematic view for explaining the processing executed by the OS core and the processing executed by the operation core in the multi-core processor as one example of the embodiment.

Then, the OS core 11a makes interrupt notification to all the operation cores 12a and 12b, as indicated by FIG. 4 (Operation A20).

The operation cores 12a and 12b having received the interrupt notification references queues each controlled by the OS cores 11a and 11b provided on the same die 10 as each of the operation cores 12a and 12b (Operation A30). That is to say, the operation core 12a references the area 31a (L2 cache 13a) and the operation core 12b references the area 31b (L2 cache 13b) (see FIG. 5).

Each operation core 12 checks for whether or not a command(s) exists in queues having been referenced (Operation A40). If there exists the command(s) (see YES in Operation A40), each operation core 12 acquires the command(s) and deletes the command(s) acquired from the area 31. Thereafter, the operation core 12 executes the acquired command(s) (Operation A50) and terminates the processing.

On the other hand, if there exists no commands in the queues, having been referenced (See NO in Operation A40), the operation core 12 references the queues controlled by the OS cores 11a and 11b on the other die 10 (Operation A60).

The operation core 12 checks for whether or not a command(s) exists in the queues (area 31) for the OS core 11 on the other die 10 having been referenced (Operation A70). As a result, if there exists the command(s) (See YES in Operation A70), the processing goes to the Operation A50. If the command(s) is not stored therein (See NO in Operation A70), the processing terminates.

Figure 6:
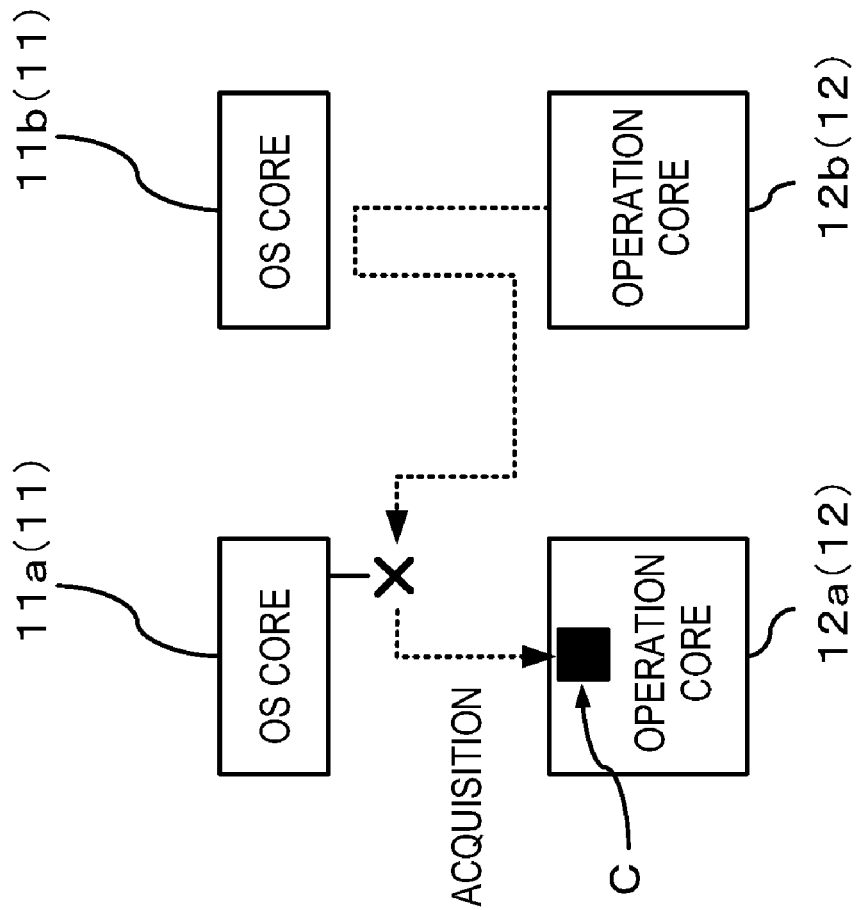
FIG. 6 illustrates a schematic view for explaining the processing executed by the OS core and the processing executed by the operation core in the multi-core processor as one example of the embodiment.

In FIG. 6, the operation core 12b references the area 31b controlled by the OS core 11b, since, as a result thereof, the command(s) is not stored in the queue in the area 31b, the operation core 12b checks to see whether or not there exists the command(s) in the queue in the area 31a controlled by the OS core 11a. Note that, in FIG. 6, upon the operation core 12b accessing the area 31a, the command(s) stored in the area 31a has already been acquired and deleted by the operation core 12a. For this reason, the operation core 12b enters into a stand-by state (that is, the idle state) and the stand-by state is maintained until the next interrupt notification is made.

FIGS. 2 through 6 disclose a case where each of the operation cores 12 placed in the idle state receives the interrupt notification from the OS cores 11. Next, a case in which either of the operation cores 12 is placed in a busy state will be disclosed.

Figure 7:
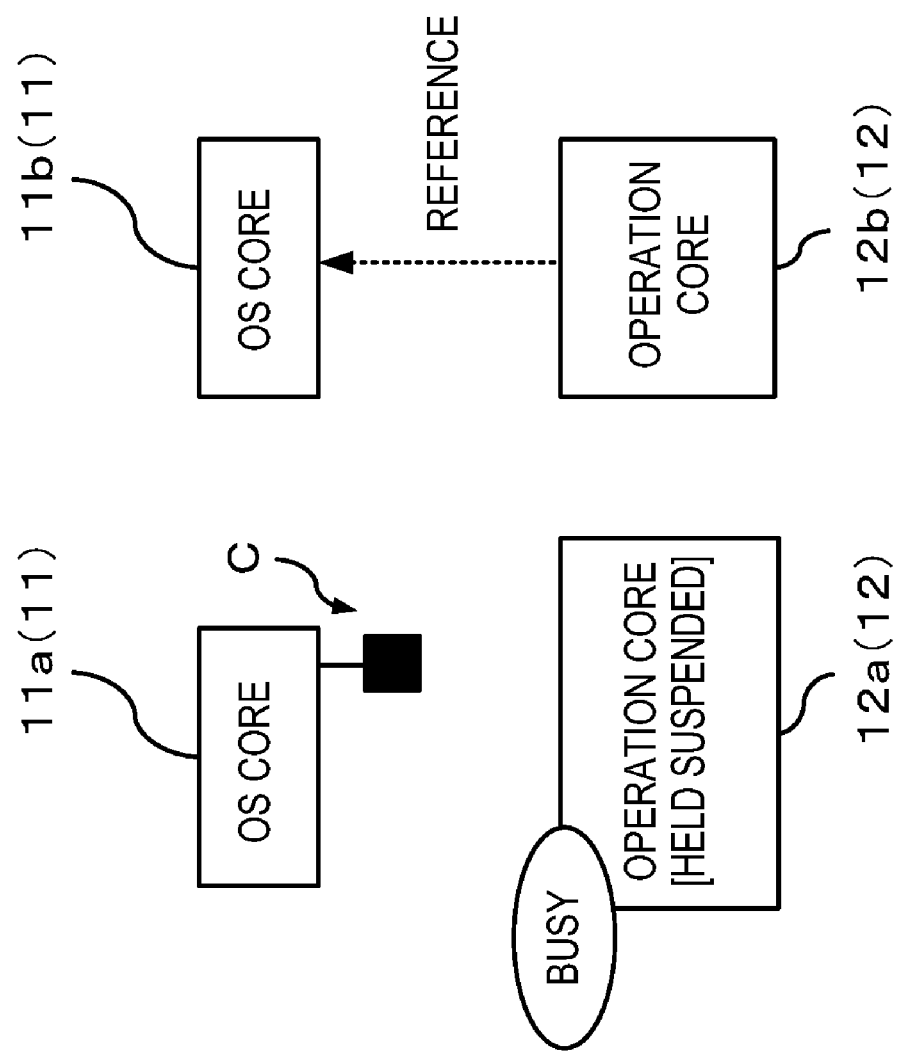
FIG. 7 illustrates a schematic view for explaining processing upon receipt of interrupt notification from the OS core in the multi-core processor as one example of the embodiment.
Figure 8:
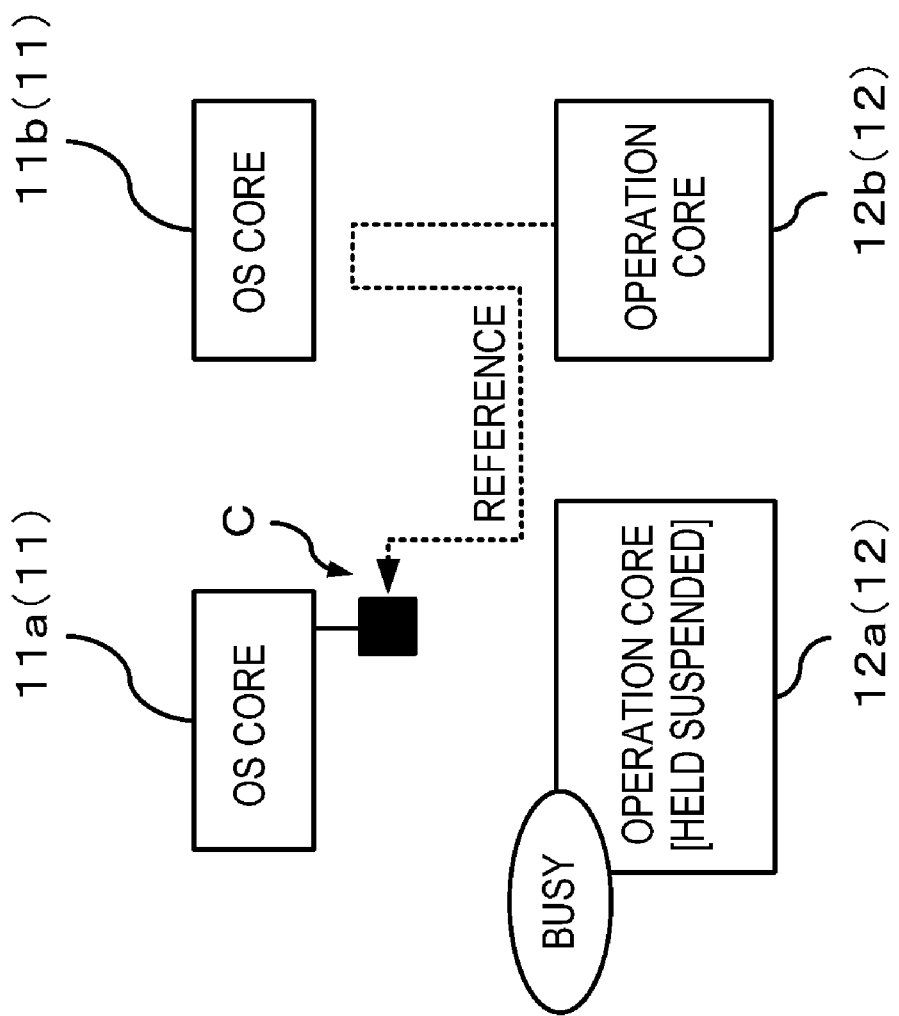
FIG. 8 illustrates is a schematic view for explaining the processing upon receipt of the interrupt notification from the OS core in the multi-core processor as one example of the embodiment.

FIGS. 7 through 9 are schematic views for explaining processing upon receipt of the interrupt notification from the OS core 11a in the multi-core processor as one example of the embodiment. FIGS. 7 through 9 are schematic views for explaining processing executed by the operation core 12a (that is placed in the busy state) of the plurality of operation cores 12a and 12b upon receipt of the interrupt notification from the OS core 11a. Note that FIGS. 7 through 9 indicate a state of the operation cores 12a and 12b after receiving the interrupt notification from the OS core 11a.

Note that, in FIGS. 7 through 9, a command(s) C actually registered in the area 31 and/or the L2 cache are shown adjacent the OS core 11a for descriptive purpose. In addition, in FIGS. 7 through 9, illustration of elements except the OS cores 11a and 11b, and the operation cores 12a and 12b are omitted for descriptive purpose.

As indicated by FIG. 7, the operation core 12b, placed in the idle state, of the operation cores 12a and 12b, having received the interrupt notification from the OS core 11a, immediately references the queue in the OS core 11b provided on the same die 10b as the operation core 12b. However, since the operation core 12b is currently executing the operation processing (that is, in the busy state) of the other command(s), referencing the queue in the OS core 11a is held suspended until this operation processing is completed, that is to say, until the busy state is cleared.

As indicated by FIG. 8, the operation core 12b references the queue (the area 31a) controlled by the OS core 11a on the die 10a, while referencing the queue (the area 31a) by the operation core 12a is held suspended.

The operation core 12b acquires a command(s) from the area 31 and deletes the command(s) acquired from the area 31a. Then, the operation core 12b processes the acquired command(s).

On the other hand, the operation core 12a, the operation processing of which has been completed, references the queue in the OS core 11a provided on the same die 10a. However, as indicated by FIG. 9, when the operation core 12a accesses the area 31a, the command(s) stored in the area 31a has already been acquired and deleted by the operation core 12b.

For this reason, the operation core 12a references the queue (the area 31b) controlled by the OS core 11b on the other die 10b. The operation core 12a enters the stand-by state if the operation core 12a is unable to find the command(s) in the queue controlled by the OS core 11b on the other die 10b, and the stand-by state is maintained until the next interrupt notification is made.

Note that the OS core 11 may make the interrupt notification only to a specific operation core 12, if information on the specific operation core 12 is acquired in order to monitor the state of the operation core 12 or if the operation core 12 on the same die 10 as the OS core 11 is placed in the busy state.

As an example of the case where the acquisition of the information on the specific operation core 12 is necessary, there may be mentioned a case where acquisition of system logs upon initializing a system or an occurrence of system abnormality.

A process specific to initiation is executed by the OS core 11 upon starting up the system (at the time of initialization processing). The OS core 11 makes the interrupt notification only to the operation core 12 to acquire the information on the specific operation core 12 in this specific process.

In addition, if the operation core 12 on the same die 10 as the OS core 11 is in the busy state, the OS core 11 directly makes the interrupt notification to the operation core 12 placed in the idle state. This may achieve a reduction in traffic in the bus 14 in comparison with a case where the interrupt notification is made to all the operation cores 12. The operation core 12 to which the interrupt notification is made, for example, first references a queue in the OS core 11 on the same die 10 as the operation core 12, and then, if the command(s) is not acquired in the queue, the operation core 12 references a queue in the OS core 11 on the other die 10.

For example, the operation core 12 writes an operating rate in a memory area capable of being referenced by all of the cores (for example, a given area of the memory 30) and the OS core 11 references the operating rate, whereby whether the operation core 12 is placed in the busy state or not may be easily determined.

In consequence, the multi-core processor according to the embodiment is not only necessary to control the state of each of the operation cores 12 but also to control allocation of tasks to the operation core 12. This facilitates the configuration of the CPU 100, so that the manufacturing cost may be reduced. Furthermore, not only a reduction in load in the CPU 100 but also an increase in processing speed may be achieved.

The multi-core processor, the method of controlling the multi-core processor, and the information processing apparatus disclosed above are not limited to the embodiment disclosed above. A variety of modifications may be made without departing from the scope of the embodiment.

For instance, the embodiment discloses an example in which the multi-core processor is provided with two (2) dies 10, and each die 10 is equipped with one (1) OS core 11 and one (1) operation core 12. However, the multi-core processor is not limited thereto. For example, the multi-core processor may be provided with two (2) or more OS cores 11 and operation cores 12 with respect to each die 10. Furthermore, the number of OS cores 11 and the number of operation cores 12 in each die 10 may be different. Moreover, three (3) or more dies 10, each of which is configured in the above disclosed manner, may be provided.

In addition, the above embodiment discloses the example in which each die 10 is provided with the L2 cache 13. However, the multi-core processor is not limited thereto. For example, the other cache, such as, an L3 cache or the like may be provided except the L2 cache. Moreover, the multi-core processor may not be provided with the L2 cache. Furthermore, a variety of arrangements may be applicable to the L2 cache 13.

Note that, other than the embodiment disclosed herein, a variety of modifications may be possible without departing from the scope of the embodiment.

According to the multi-core processor, the method of controlling the multi-core processor, and the information processing apparatus disclosed above, the configuration of the multi-core processor may be facilitated, the manufacturing cost thereof may be reduced, the load imposed thereon may be reduced, and the processing speed thereof may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A multi-core processor which includes a plurality of processor dies, the multi-core processor comprising:
    a first processor core and a second processor core formed on each of the plurality of processor dies;
    the first processor core processing a first task; and
    the second processor core processing a second task, wherein
    when the first processor core makes a request for the second task processing in processing the first task, information on the second task is stored in a memory area used by the first processor core and interrupt notification is made to each of the second processor cores provided respectively on the plurality of processor dies, and
    each of the second processor cores having received the interrupt notification accesses the memory area used by the first processor core provided on the same processor die as the processor die on which the second processor core is provided.

2. The multi-core processor according to claim 1, wherein when the second processor core having received the interrupt notification is currently processing a third task, the second processor core having received the interrupt notification accesses the memory area used by the first processor core provided on the same processor die as the processor die on which the second processor core is provided after completion of the task currently being processed.

3. The multi-core processor according to claim 1, wherein access is made to the memory area used by the first processor core provided on the processor die different from the processor die on which the second processor core is provided, if the second processor core having received the interrupt notification is unable to acquire the information on the second task from the memory area as a result of the access to the memory area used by the first processor core provided on the same processor die as the processor die on which the second processor core is provided.

4. The multi-core processor according to claim 1, wherein the first processor core also stores the information on the second task in a cache provided on the same processor die as the processor die on which the first processor core is provided.

5. A method of controlling in a multi-core processor which includes a plurality of processor dies on each of which a first processor core processing a first task and a second processor core processing a second task are formed, the method comprising:
    storing information on the second task in a memory area used by the first processor core when the first processor core makes a request for the second task processing to each of the second processor cores provided respectively on the plurality of processor dies based on the processing of the first task;
    making interrupt notification from the first processor core to each of the second processor cores provided respectively on the plurality of processor dies; and
    accessing the memory area used by the first processor core provided on the same processor die as the processor die on which each of the second processor cores having received the interrupt notification is provided.

6. The method according to claim 5, wherein the access to the memory area used by the first processor core is made after completion of the second task if the second processor core is currently processing a task upon receipt of the interrupt notification.

7. The method according to claim 5, further comprising:
    accessing the memory area used by the first processor core provided on the processor die different from the processor die on which the second processor core is provided if the information on the second task is unable to be acquired from the memory area as a result of the access to the memory area used by the first processor core provided on the same processor die as the processor die on which the second processor core having received the interrupt notification is provided.

8. The method according to claim 5, further comprising:
    also storing the information on the second task in a cache provided on the same processor die as the processor die on which the first processor core is provided.

9. An information processing apparatus including a memory and a multi-core processor having a plurality of processor dies, the multi-core processor comprising:
    a first processor core and a second processor core formed on each of the plurality of processor dies;
    the first processor core processing a first task; and
    the second processor core processing a second task, wherein
    the first processor core stores information on the second task in a memory area used by the first processor core of the memory through a memory control hub when making a request for the second task processing in processing the first task and makes interrupt notification to each of the second processor cores provided respectively on the plurality of processor dies, and
    each of the second processor cores having received the interrupt notification accesses the memory area used by the first processor core provided on the same processor die as the processor die on which the second processor core, associated with the memory, is provided.

* * * * *